Figure 3:
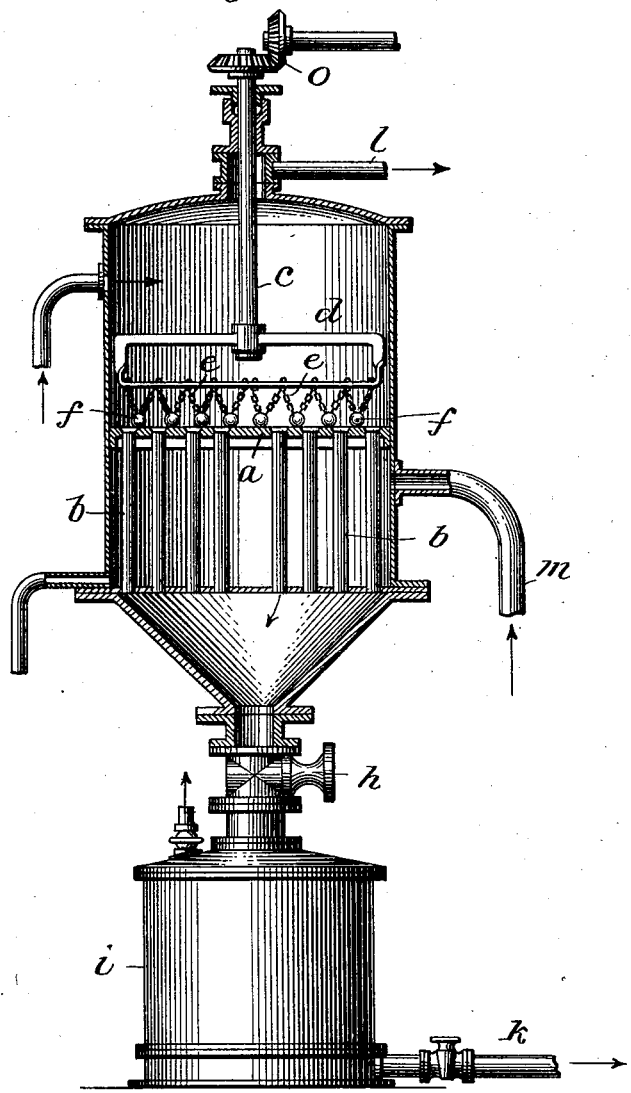

No. 718,798. PATENTED JAN. 20, 1903.
O. SACHSE.
BRINE EVAPORATOR.
APPLICATION FILED FEB. 1, 1902.
NO MODEL. 2 SHEETS—SHEET 1.
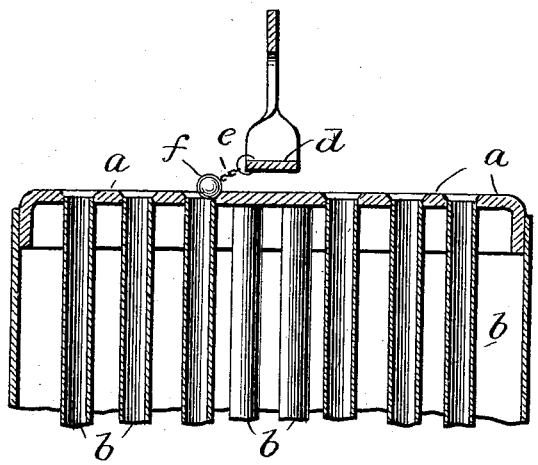
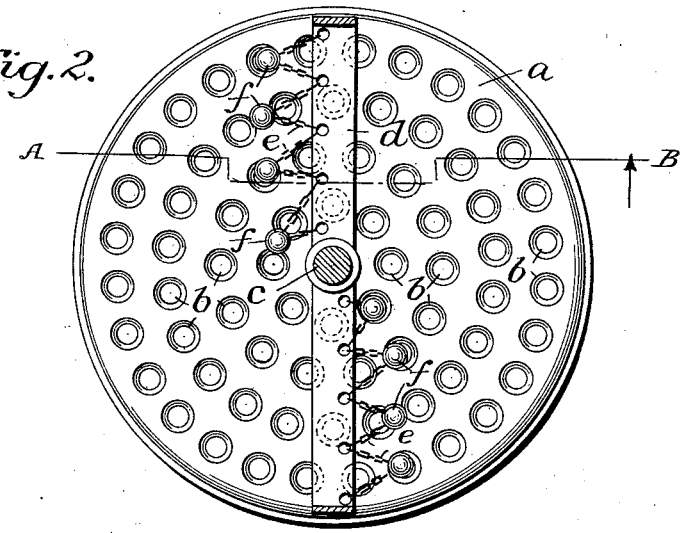

No. 718,798. PATENTED JAN. 20, 1903.
O. SACHSE.
BRINE EVAPORATOR.
APPLICATION FILED FEB. 1, 1902.
NO MODEL. 2 SHEETS—SHEET 2.

Witnesses
J. G. Hinkel
G. P. Kramer

Inventor
Otto Sachse
By Foster Freeman
Attorneys

UNITED STATES PATENT OFFICE.

OTTO SACHSE, OF LÜNEBURG, GERMANY.

BRINE-EVAPORATOR.

SPECIFICATION forming part of Letters Patent No. 718,798, dated January 20, 1903.

Application filed February 1, 1902. Serial No. 92,117. (No model.)

*To all whom it may concern:*

Be it known that I, OTTO SACHSE, director of the salt-works of Lüneburg, residing at Lüneburg, Germany, have invented certain new and useful Improvements in or Relating to Brine-Evaporators, of which the following is a specification.

This invention relates particularly to continuously-operating upright-tube brine-evaporators, its object being to obviate the drawback which attends existing apparatus of this class—viz., the rapid clogging of the tubes by salt deposits. This object is accomplished by the arrangement of agitating mechanism above the tube-orifices, at which the salt is thereby prevented from collecting. By thus hindering the salt from settling at the upper orifices of the tubes the tubes are protected from obstruction throughout their full length by reason of the fact observed by me that the clogging of the tubes begins at the upper tube ends and gradually extends downward, and inasmuch as the accumulation of salt is promoted by the presence at the upper ends of "dead" spaces, which are formed, say, by the usual disposition, in which the tube ends project above the tube-plate which holds them, care is taken in accordance with this invention to make the upper ends of the tubes flush with the upper surface of the said plate. The result attained by the provision of agitating mechanism, with the object of protecting the upper tube-orifices from obstruction, is that the extra labor hitherto necessitated by the formation of the salt deposits on the tube-walls, which had to be detached and removed at frequent intervals by sending water, steam, dilute brine, &c., through the tubes, together with various inconveniences attaching to that operation, is avoided.

The form of agitating mechanism which is preferred is what may be described as a "trailing" agitating device—*i. e.*, a device from the revolving arm or arms of which are suspended a number of chains, which may be weighted with balls or other similar heavy bodies and which is so arranged that all the upper tube ends are subjected to the combined knocking and jumping action which is exercised by the device thus constructed when in motion. For the chains other equivalent trailing bodies may of course be substituted, if desired.

Experiments have shown that an evaporating apparatus is highly serviceable for the purpose which has an upright tubular body the tubes of which do not extend with their upper ends over the upper surface of the tube-holding plate and which apparatus is furthermore provided with a trailing agitator adapted to complete about six revolutions per minute and capable of turning either to the left or to the right. The agitator is placed about one meter above the tube-plate and provided with a somewhat large number of depending chains made up of links of medium size. With apparatus such as this operations have been conducted for months together without the least interruption. It goes without saying that the brine which was used for the experiment had previously been freed from salts (such as gypsum or the like) having the property of forming crusts or scales.

One form of the novel apparatus carried out in accordance with this invention is shown by way of illustration in the accompanying drawings, in which—

Figure 1 is a vertical section on line A B, Fig. 2; and Fig. 2 is a plan of a tubular apparatus, representing, partly in section, a ball trailing agitator arranged above the upper tube-plate. Fig. 3 shows a vertical sectional view of a complete evaporating apparatus in accordance with this invention.

The upper tube-plate of the tubular apparatus is designated by the letter $a$. It supports the vertical tubes $b$, arranged in concentric circles and so secured in the tube-plate that their ends do not protrude above the top surface of the tube-plate. Over this top surface of the tube-plate a ball trailing agitator is arranged. It consists of a revolving shaft $c$, which carries an arm $d$. To the arm $d$ chains $e$ are attached, and from the chains balls $f$, resting upon the tube-plate, are suspended.

The operation of the mechanism is as follows: Shaft $c$ is rotated by the driving-gear $o$. By this rotary motion is imparted to the arm $d$, which in turning takes the trailing arrangements of chains $e$ and balls $f$ around with it, the balls and chains dragging behind. The balls $f$ on being thus set in motion describe circles and as they do so enter the tube-orifices which they encounter in their circular course, thereby keeping them free from any salt deposits. Besides this the operation of the apparatus is as usual. Brine is introduced through pipe $g$. The deposited salt, together with a small portion of brine, is carried out through valve $h$ into a filter $i$, where it is separated from the brine. The brine is let out through pipe $k$. The vapor is discharged through pipe $l$. Heating-steam is introduced through pipe $m$. Condensed water is discharged through pipe $n$.

While I have described and shown a chain-and-ball trailing device, I may employ other forms of agitating devices adapted to sweep over the upper orifices of the tubes without departing from my invention.

Having now particularly described and ascertained the nature of my said invention and in what manner the same is to be performed, I declare that what I claim is—

1. In a brine-evaporator, the combination of a receptacle with brine-feeding and vapor-discharging devices, a steam-chamber, upright tubes in said steam-chamber fixed in tube-plates and communicating with said receptacle, and an agitating device arranged above the upper tube-plate and movable to sweep over the upper orifices of said tubes.

2. In a brine-evaporator, the combination of a receptacle with brine-feeding and vapor-discharging devices, a steam-chamber, upright tubes in said steam-chamber fixed in tube-plates and communicating with said receptacle, and a trailing agitator rotatably mounted above the upper tube-plate with trailing bodies adapted to sweep over the upper tube-orifices.

3. In a brine-evaporator, the combination of a receptacle with brine feeding and discharging devices, a steam-chamber, upright tubes in said steam-chamber fixed in tube-plates and communicating with said receptacle, rotatably-mounted arms above the upper tube-plate, chains fixed to said arms and provided with heavy bodies at their free ends, said heavy bodies adapted to sweep over the upper orifices of the tubes.

Signed this 17th day of January, 1902, at Hamburg.

OTTO SACHSE.

Witnesses:
   OTTO W. HELLMRICH,
   IDA CHRIST. HAFERMANN.